US012444270B2

(12) United States Patent
Audia et al.

(10) Patent No.: US 12,444,270 B2
(45) Date of Patent: Oct. 14, 2025

(54) GAMING MACHINE AND METHOD WITH MULTIPLIER EFFECTS

(71) Applicant: Everi Games Inc., Austin, TX (US)

(72) Inventors: Cydny Bloem Audia, Chicago, IL (US); Scott Donald Slomiany, Rolling Meadows, IL (US); Juan Carlos Mariscal, Lincolnwood, IL (US)

(73) Assignee: Everi Games, Inc., Austin, TX (US)

( * ) Notice: Subject to any disclaimer, the term of this patent is extended or adjusted under 35 U.S.C. 154(b) by 555 days.

(21) Appl. No.: 17/952,449

(22) Filed: Sep. 26, 2022

(65) Prior Publication Data

US 2023/0099020 A1 Mar. 30, 2023

Related U.S. Application Data

(60) Provisional application No. 63/250,879, filed on Sep. 30, 2021.

(51) Int. Cl.
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/34* (2013.01)

(58) Field of Classification Search
CPC ... G07F 17/34; G07F 17/3244; G07F 17/3267
See application file for complete search history.

(56) References Cited

U.S. PATENT DOCUMENTS

| | | | | |
|---|---|---|---|---|
| 2,743,108 | A | 4/1956 | Sanders | |
| 4,695,053 | A | 9/1987 | Vazquez, Jr. et al. | |
| 4,721,307 | A | 1/1988 | Okada | |
| 4,836,546 | A | 6/1989 | DiRe et al. | |
| 5,205,555 | A | 4/1993 | Hamano | |
| 5,580,053 | A | 12/1996 | Crouch | |
| 5,823,874 | A * | 10/1998 | Adams | G07F 17/32 D21/370 |
| 6,015,346 | A | 1/2000 | Bennett | |
| 6,102,798 | A | 8/2000 | Bennett | |

(Continued)

FOREIGN PATENT DOCUMENTS

| | | | | |
|---|---|---|---|---|
| WO | WO-03028825 | A1 * | 4/2003 | G07F 17/32 |
| WO | WO-2007030670 | A2 * | 3/2007 | G07F 17/3244 |
| WO | WO-2010102330 | A1 * | 9/2010 | G07F 17/3262 |

*Primary Examiner* — Steven J Hylinski

(74) *Attorney, Agent, or Firm* — Calvert Technology Law, PLLC; Nathan H. Calvert

(57) ABSTRACT

A gaming machine is controlled with program code for, in response to a play input causing a display system to display a base result representation in a first area of the display system including a matrix of symbol locations with a first line of symbols randomly selected from among multiplier symbols and non-operative symbols, a second line of symbols randomly selected from among multiplier symbols and non-operative symbols, and a third line of symbols randomly selected from among prize symbols and non-operative symbols. In response to an alignment of a multiple-location prize symbol along multiple alignment paths with a plurality of multiplier symbols on each alignment path, awarding a prize amount of a prize associated with the prize symbol times a combined multiplier value indicated by all the multiplier symbols so aligned.

19 Claims, 7 Drawing Sheets

(56) References Cited

U.S. PATENT DOCUMENTS

| | | | | |
|---|---|---|---|---|
| 6,142,873 | A | 11/2000 | Weiss | |
| 6,155,925 | A | 12/2000 | Giobbi | |
| 6,174,234 | B1 | 1/2001 | Seibert | |
| 6,174,235 | B1 | 1/2001 | Walker | |
| 6,217,022 | B1 | 4/2001 | Astaneha | |
| 6,231,442 | B1 | 5/2001 | Mayeroff | |
| 6,251,013 | B1 | 6/2001 | Bennett | |
| 6,261,178 | B1 | 7/2001 | Bennett | |
| 6,312,334 | B1 | 11/2001 | Yoseloff | |
| 6,319,124 | B1 | 11/2001 | Baerlocher | |
| 6,328,649 | B1 * | 12/2001 | Randall | G07F 17/34 463/20 |
| 6,358,147 | B1 | 3/2002 | Jaffe | |
| 6,398,218 | B1 | 6/2002 | Vancura | |
| 6,413,161 | B1 | 7/2002 | Baerlocher | |
| 6,569,015 | B1 * | 5/2003 | Baerlocher | G07F 17/32 463/16 |
| 6,604,999 | B2 | 8/2003 | Ainsworth | |
| 6,641,477 | B1 | 11/2003 | Dietz | |
| 6,672,960 | B1 | 1/2004 | B-Jensen | |
| 6,688,977 | B1 | 2/2004 | Baerlocher | |
| 6,733,385 | B1 | 5/2004 | Enzminger et al. | |
| 6,875,108 | B1 | 4/2005 | Hughs-Baird | |
| 6,910,962 | B2 | 6/2005 | Marks et al. | |
| 7,192,347 | B1 | 3/2007 | Marks et al. | |
| 7,357,713 | B2 | 4/2008 | Marks et al. | |
| 7,377,849 | B2 | 5/2008 | Baerlocher | |
| 7,476,155 | B2 | 1/2009 | Lind et al. | |
| 7,686,686 | B2 | 3/2010 | Marks et al. | |
| 7,766,741 | B2 | 8/2010 | Lind et al. | |
| 8,083,581 | B2 | 12/2011 | Marks et al. | |
| 8,087,990 | B2 | 1/2012 | Lind et al. | |
| 8,187,080 | B2 | 5/2012 | Sims | |
| 8,216,050 | B2 | 7/2012 | Lind et al. | |
| 8,235,787 | B2 | 8/2012 | Lind et al. | |
| 9,251,667 | B2 | 2/2016 | Marks et al. | |
| 9,542,808 | B2 | 1/2017 | Marks et al. | |
| 10,115,272 | B2 | 10/2018 | Marks et al. | |
| 10,255,752 | B2 | 4/2019 | Singer et al. | |
| 10,417,870 | B2 | 9/2019 | Marks et al. | |
| 10,699,515 | B2 | 6/2020 | Singer et al. | |
| 10,699,516 | B2 | 6/2020 | Singer et al. | |
| 2002/0022509 | A1 | 2/2002 | Nicastro | |
| 2002/0187827 | A1 | 12/2002 | Blankstein | |
| 2003/0036422 | A1 | 2/2003 | Baerlocher | |
| 2003/0134677 | A1 | 7/2003 | Obied | |
| 2006/0046833 | A1 | 3/2006 | Hatakeyama | |
| 2009/0117991 | A1 | 5/2009 | Yoshizawa | |
| 2009/0124338 | A1 | 5/2009 | Watkins et al. | |
| 2009/0233692 | A1 | 9/2009 | Yoshizawa | |
| 2010/0016059 | A1 | 1/2010 | Sims | |
| 2011/0006477 | A1 | 1/2011 | Miller | |
| 2015/0080095 | A1 * | 3/2015 | Nicely | G07F 17/3244 463/20 |
| 2017/0024958 | A1 | 1/2017 | Singer | |
| 2017/0024970 | A1 * | 1/2017 | Sherrets | G07F 17/3267 |
| 2018/0033253 | A1 * | 2/2018 | Vann | G07F 17/3246 |
| 2020/0250922 | A1 | 8/2020 | Medford | |

* cited by examiner

61

GAMING MACHINE AND METHOD WITH MULTIPLIER EFFECTS

CROSS-REFERENCE TO RELATED APPLICATIONS

Applicant claims the benefit, under 35 U.S.C. § 119(e), of U.S. Provisional Patent Application No. 63/250,879 filed Sep. 30, 2021, and entitled "Gaming Machine and Method with Multiplier Effects." The entire content of this provisional application is incorporated herein by this reference.

FIELD OF THE INVENTION

This invention relates to gaming systems and to gaming machines through which players may participate in wagering games, and in particular gaming machines including games with multiplier symbols and prize symbols.

BACKGROUND

Many different types of gaming machines have been developed to provide various formats and graphic presentations for conducting games and presenting game results. For example, numerous mechanical reel-type gaming machines, also known as slot machines, have been developed with different reel configurations, reel symbols, and paylines. More recently, gaming machines have been developed with video monitors that are used to produce simulations of mechanical spinning reels. These video-based gaming machines may use one or more video monitors to provide a wide variety of graphic effects in addition to simulated spinning reels, and may also provide secondary/bonus games using different reel arrangements or entirely different graphics. Many video-based gaming machines have three or five spinning reels that may be stopped to display a matrix of game symbols. The symbols displayed on the stopped reels correlate to a result of the game. Video-based gaming machines may also be used to show card games or various types of competitions such as simulated sporting competitions on which wagers may be placed. A popular use of wagering games is simulated wagering in which money is never involved, and instead points or simulated currency are wagered. Many "virtual casino" websites and smartphone apps employ such a scheme in addition to or instead of money wagering.

A typical reel-based slot machine game includes a number of paylines defined through symbol locations on a reel. Numerous variations are used to improve the prize variability and player enjoyment associated with such payline games. However, game manufacturers are continuously pressed to develop new game presentations, formats, and game graphics in an attempt to provide high entertainment value for players and thereby attract and keep players.

SUMMARY OF THE INVENTION

The present invention encompasses methods for controlling wagering games, gaming machines, and computer programs that provide numerous tiered prizes which are coordinated with graphic presentations to vary the playing experience.

A gaming machine, method, and program product provide a slot machine game with a multiplier symbols on some reels and prize symbols on other reels. Paylines are formed by the alignment of multiplier symbols with prize symbols. A multiple-location prize symbol can align with multiplier symbols along more than one alignment path.

According to one aspect of the invention, a method is provided for controlling the operation of a gaming machine. The method includes, in response to a play input entered through a player input device of the gaming machine and under control of a processing system of the gaming machine, causing a display system of the gaming machine to display a base result representation in a first area of the display system comprising a matrix of symbol locations including a first line of symbols randomly selected from among multiplier symbols and non-operative symbols, a second line of symbols randomly selected from among multiplier symbols and non-operative symbols, and a third line of symbols randomly selected from among prize symbols and non-operative symbols, the prize symbols comprising multiple-location symbols and single location symbols. In response to an alignment of a prize symbol with a first plurality of multiplier symbols, the method includes awarding a prize amount of a prize associated with the prize symbol times a combined multiplier value indicated by the multiplier symbols. In response to an alignment of a multiple-location prize symbol along multiple alignment paths with a plurality of multiplier symbols on each alignment path, the method includes awarding a prize amount of a prize associated with the prize symbol times a combined multiplier value indicated by all the multiplier symbols so aligned.

In some implementations, the first, second, and third lines of symbols are slot machine reels.

In some implementations, the method includes, in response to a trigger condition for the play input and under control of the processing system, causing the display system to display an operation of a prize selector to select a prize amount from among a plurality of available prize amounts and causing the display system to replace a symbol in the third line of symbols with a new prize symbol associated with the prize amount before awarding a prize.

In some implementations, the trigger condition is a designated symbol appearing in the third line of symbols. The prize selector may be a selector wheel positioned in a second display area of the display system.

In some implementations, the method includes, in response to a bonus trigger event, entering a second bonus mode in which at least one of the first, second, and third lines of symbols includes no non-operative symbols. The third line of symbols may be modified to include no non-operative symbols.

In some implementations, the method includes, in response the alignment of a multiple-location prize symbol along multiple alignment paths with a plurality of multiplier symbols on each alignment path, displaying a graphic sequence combining the plurality of multiplier symbols from the multiple alignment paths to create a larger multiplier symbol with a multiplier value of the product of all the multiplier symbols so aligned.

Another aspect of the invention is a gaming machine including a display system, an audio device, a player input device, and at least one electronic controller operatively coupled to the display system, the audio device and the player input device and configured to execute instructions to perform the method. A tangible, non-transitory electronically accessible memory is connected to the at least one electronic controller and contains program code executable by the at least one electronic controller for performing the method.

Another aspect of the invention is a computer program stored on a non-transitory computer readable medium. The software version is, of course, typically designed to be executed by a gaming machine or networked gaming system. The software includes multiple portions of computer executable code referred to as program code. Gaming results are provided in response to activations and displayed by display program code that generates simulated slot reels each including one or more symbol locations. The program also has game controller program code for determining game play results involving operating the gaming machine according to the methods above.

Another aspect of the invention is a gaming system that includes one or more gaming servers, and a group of electronic gaming machines connected to the servers by a network, programmed to provide one of more of the methods described herein. The various functionality described herein may be distributed between the electronic gaming machines and the gaming servers in any practically functional way. For example, the current preferred architecture is for the servers to determine all aspects of game logic, random number generation, and prize awards. The gaming machines provide functionality of interfacing with the player and animating the game results to present the results received from the server in an entertaining manner. However, other embodiments of course might use a thin client architecture in which the animation is also conducted by the server and electronic gaming machines serve merely as a terminal to receive button or touchscreen input from the player and to display graphics received from the server.

Different features may be included in different versions of the invention. These and other advantages and features of the invention will be apparent from the following description of the preferred embodiments, considered along with the accompanying drawings.

DETAILED DESCRIPTION OF EXAMPLE EMBODIMENTS

Figure 1:
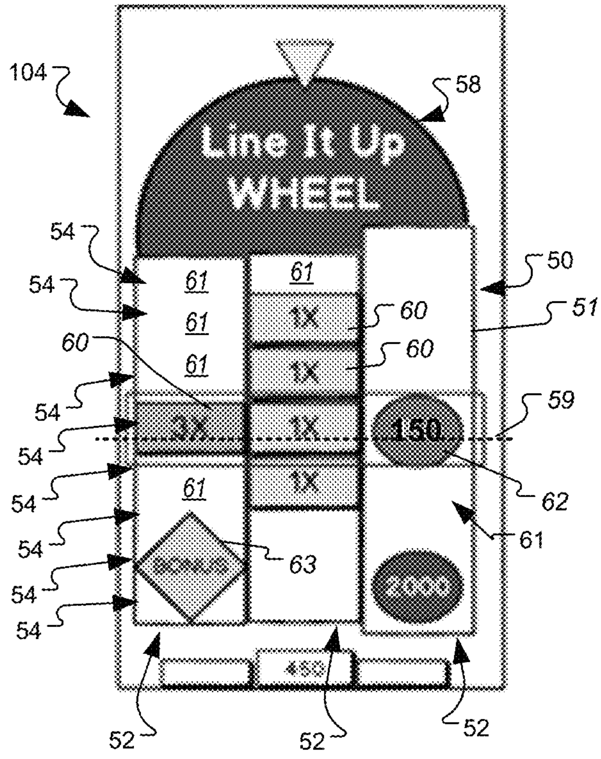
FIG. 1 is a game screen diagram illustrating a base game mode showing a primary display to illustrate an example slot machine display arrangement on which wagering game results are presented in a primary display area according to some embodiments.
Figure 2:
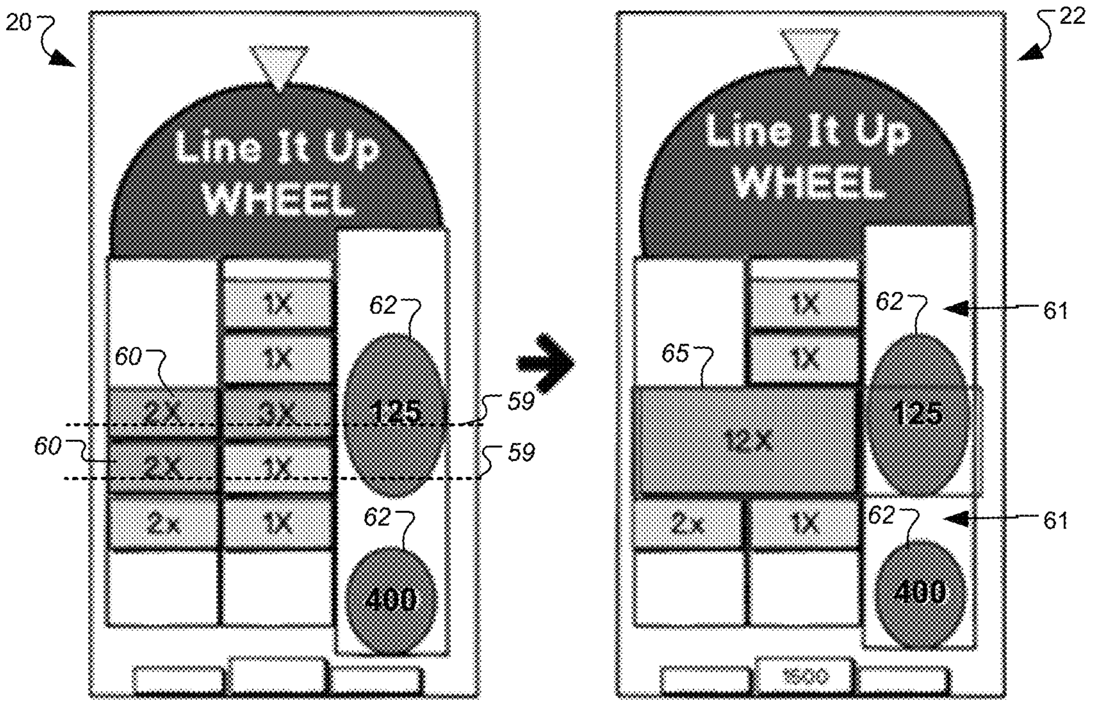
FIG. 2 shows a sequence of two game screens and occurring in the example base game mode of FIG. 1.

FIG. 1 is a game screen diagram illustrating a base game mode showing a primary display 104 to illustrate an example slot machine display arrangement on which wagering game results are presented in a primary display area 50, typically found on the primary display. FIG. 2 shows a sequence of two game screens 20 and 22 occurring in the example base game mode of FIG. 1. Referring to FIGS. 1-2, a secondary display area 58 is present on the display 104, typically located toward the top of the display. In versions including multiple displays, secondary display area 58 may be located on a secondary, upper display.

The primary display area 50 in the depicted mode presents a reel-type primary game (as opposed to bonus games or other feature games as described herein), which in this version includes a matrix 51 of symbol locations 54 arranged in rows and columns to represent simulated slot machine reels that are spun to conduct a game round. Other embodiments may, of course, use other types of game displays to display randomizing of symbols according to the methods herein. The depicted columns of symbol locations labeled 52 represent the simulated reels, while symbols are shown in each symbol location designated 54. In this instance there are three reels with nine symbol locations 54 displayed at a time on each reel, but the game can be played with more reels. The simulated reel typically has far more symbols than those displayed, and as many unique stop positions as there are symbols on the simulated reel. The stop position may be counted, for example, by numbering the symbols on the simulated reel and using the number of the symbol at the bottom of the display window (the three symbols displayed in this example), or at the top or middle.

Winning patterns are formed by matching symbols along defined paylines that pass through the matrix 51. In this embodiment, the paylines are defined along horizontally adjacent symbol locations, such as the depicted payline 59 showing a winning outcome. Generally, the matrix 51 of symbol locations including a first column 52 of symbols randomly selected from among multiplier symbols 60 and non-operative symbols 61. Non-operative symbols 61 are depicted as blank symbol locations in this embodiment, however other embodiments may instead depict them with a suitable graphic symbol indicating a non-operative or blank symbol. Matrix 51 also includes a second, middle, column 52 of symbols randomly selected from among multiplier symbols 60 and non-operative symbols 61, and a third column 52 of symbols randomly selected from among prize symbols 62 and non-operative symbols 61. Prize symbols include multiple-location symbols such as the prize symbol 62 shown in FIG. 2, and single location symbols such as prize symbol 62 shown in FIG. 1. Multiple-location symbols span multiple locations along the column 52 and include graphic indicator showing that visually spans multiple symbol locations. In this embodiment, multiple-location prize symbols 62 vary from two to four symbol locations in height or width. For example, FIG. 2 shows a multiple-location prize symbol 62 with a prize "400" spanning two symbol locations, and a multiple location prize symbol 62 with a prize "125" spanning three symbol locations.

In some embodiments, a bonus symbol 63 has a possibility of appearing in one or more of columns 52. Two bonus symbols appearing in matrix 51 trigger a bonus feature as further described below with respect to FIGS. 3-5.

While columns are used herein, other lines of symbols such as rows may also be used to provide simulated reels or other symbol arrays that are filled with randomly selected symbols to produce game round results. In such embodiments, multiple-location prize symbols span multiple locations along the line.

Figure 5:
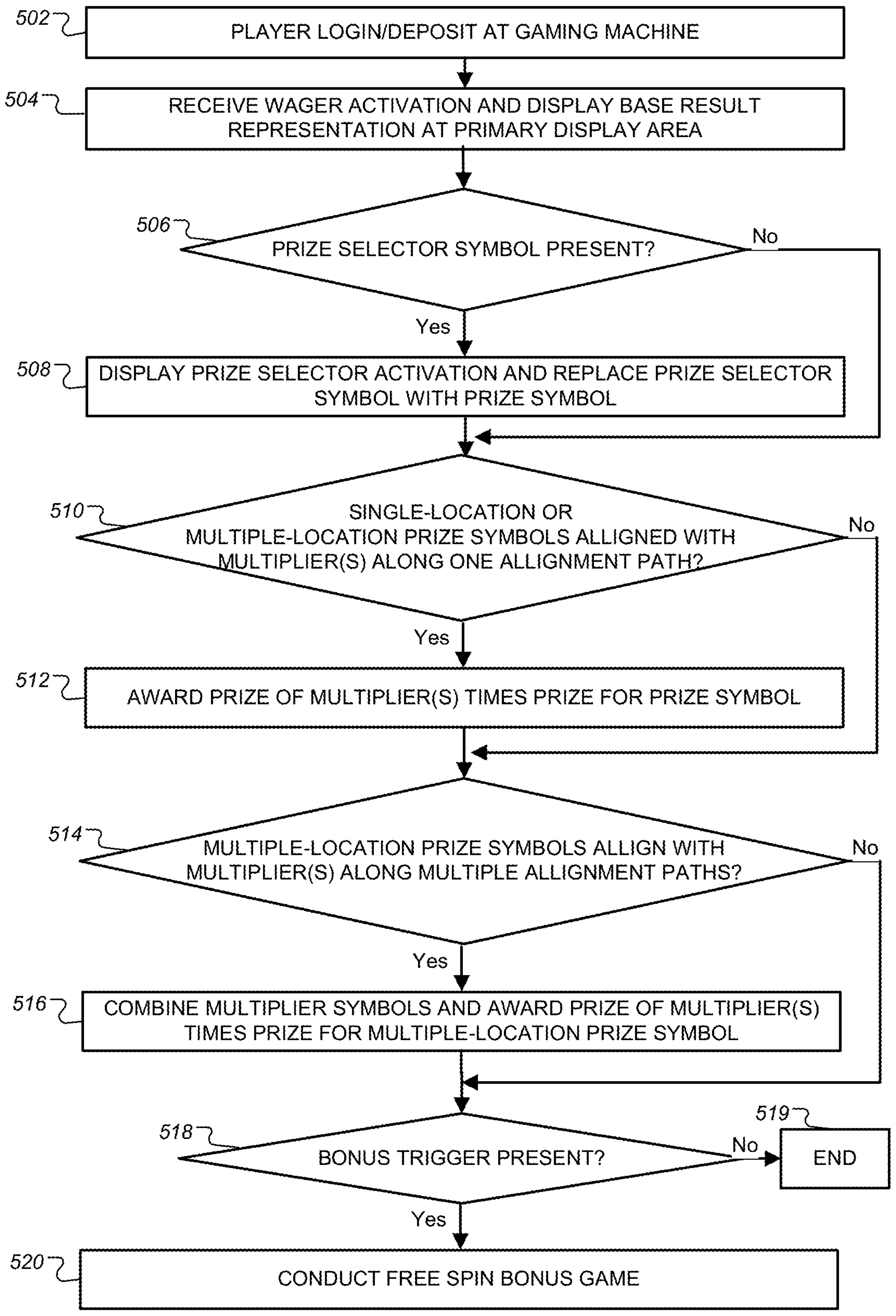
FIG. 5 shows a flow diagram of a process for operating a gaming machine according to some embodiments.

In the sequence of FIG. 2, four multiplier symbols 60 are visually and mathematically combined into a larger multiplier symbol 65 spanning two columns 52 and multiple symbol locations on each of the two columns, and having a multiplier effect of the combined multiplier values of the four symbols 60, as further described with respect to FIG. 5.

Figure 3:
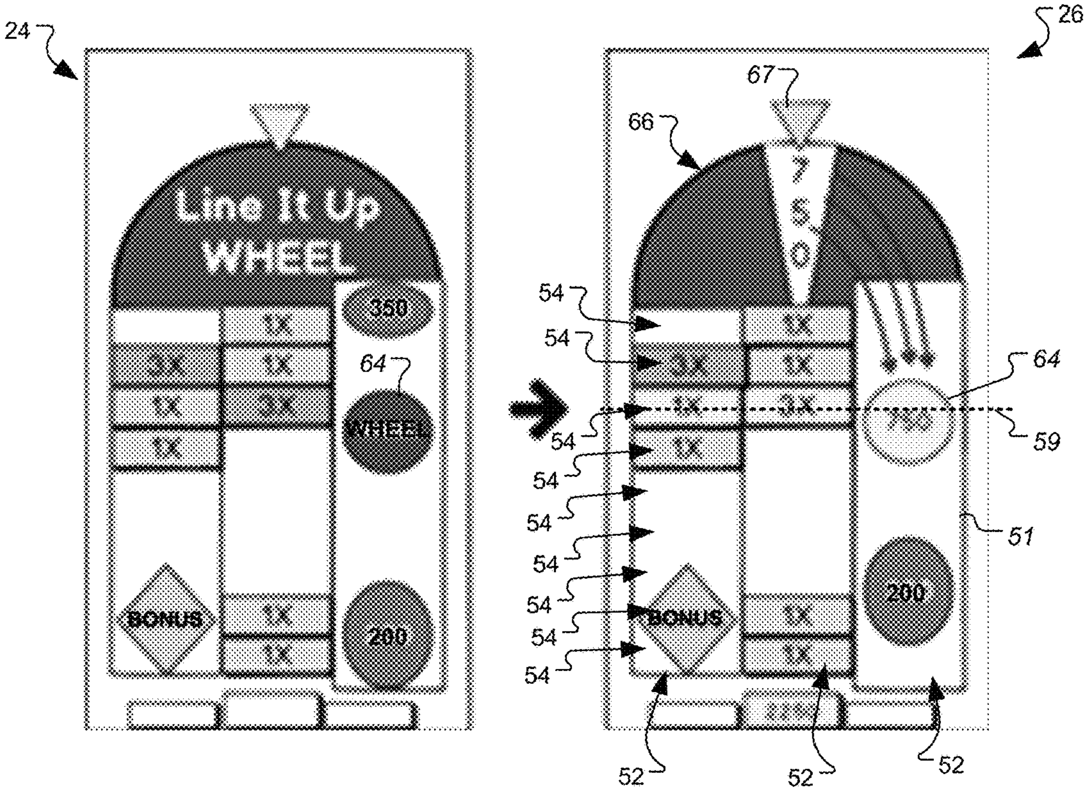
FIG. 3 shows a sequence of two game screens and occurring in the example base game mode of FIG. 1 including a wheel activation.

FIG. 3 shows a sequence of two game screens 24 and 26 occurring in the example base game mode of FIG. 1 including a wheel activation. In the depicted result of game screen 24, a prize selector symbol 64 labelled "WHEEL" is present, which triggers a wheel selection sequence as shown in game screen 26. In the wheel selection sequence, a wheel 66 is activated and is visually depicted as spinning to select a segment of the wheel with a prize amount, such as the depicted segment showing a prize amount of "750". The segment is selected in the spin by spinning and stopping the wheel to select a segment as indicated by indicator 67. The prize amount provided by the selected segment is then used to replace the prize selector symbol 64 in the third column 52 of symbols with a new prize symbol associated with the prize amount, as depicted by the arrow showing prize selector symbol 64 being graphically modified on the display to show "750". The matrix 51 is then evaluated with the modified prize selector symbol counting as a prize symbol for forming a payline 59 with the aligned multiplier symbols labelled "1×" and "3×". While a wheel is spun to select a prize amount in this embodiment, other embodiments may of course use other randomized selection elements to select a prize.

Figure 4:
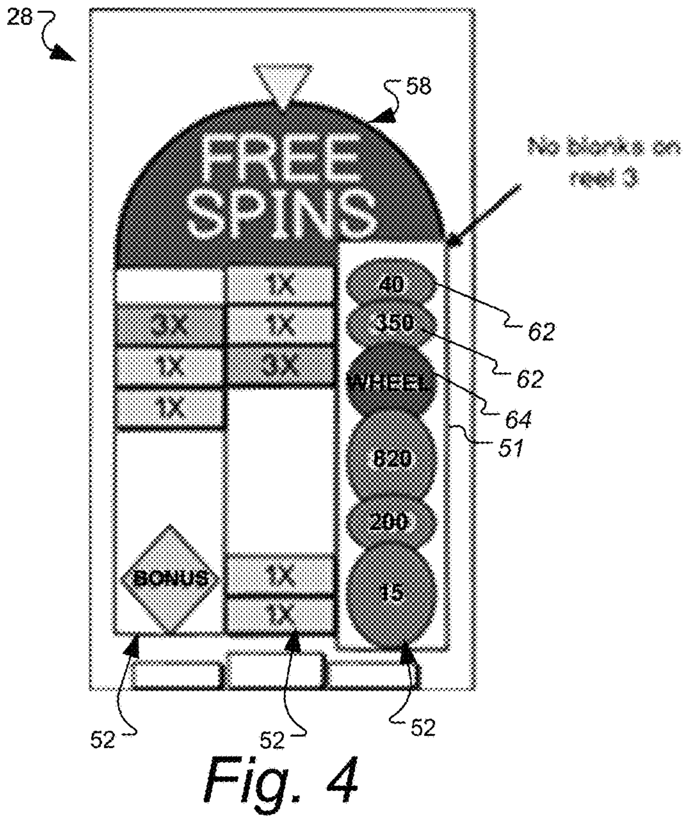
FIG. 4 shows an example game screen diagram of a free spin bonus sequence that may trigger based on the base game results of a base game mode like the base game mode shown in FIG. 1.

FIG. 4 shows an example game screen diagram of a free spin bonus sequence that may trigger based on the base game results of a base game mode like the base game mode shown in FIG. 1. As shown by the text "FREE SPINS" in secondary display area 58, a second free spin bonus mode has been triggered by a base game result. In this embodiment, the trigger is activated by the appearance of two bonus symbols 63 in a base game result. Other embodiments may of course include other suitable trigger conditions. In the depicted free spin bonus sequence, the third column 52 of symbol locations is altered to always include no non-operative symbols locations, as indicated by the text "No blanks on reel 3". Each free spin is evaluated by forming paylines 59 as described below to include aligned multiplier symbols 60 and prize symbols 62.

FIG. 5 shows a flow diagram of a process for operating a gaming machine according to some embodiments. Generally, the process is performed responsive to play activation inputs entered through a player input device of the gaming machine and under control of a processing system of the gaming machine. The process beings at block 502 where a player logs into a gaming machine or makes a credit deposit to establish a credit balance at the gaming machine. This includes receiving the player deposit through a credit input device such as a bill/voucher acceptor, and in response activating a credit meter value that establishes a player credit balance.

To begin a game play, at block 504 the process receives a wager activation on a player input device at the gaming machine, which typically consists of some input from the player to set the amount to be wagered from their credit amount on the machine and activate a game round using the set wager amount. The wager amount may also be carried over from previous game rounds by simply starting the game with the previous wager amount set. This typically happens through a 'Play' button (110, FIG. 7) on the game cabinet or touchscreen display, and serves to place the wager and start a single round of game play in the base game. The game round includes randomly selecting symbols to populate matrix 51 and displaying matrix 51 being updated to include the selected symbols as depicted, for example, in the embodiment of FIG. 1.

At block 506, the process checks for a trigger condition for conducting the prize selector sequence of FIG. 3. In this embodiment, the trigger condition is the presence of the "WHEEL" prize selector symbol. If the trigger condition is not present, the process continues to block 510. Responsive to the trigger condition being present at block 506, the process goes to block 508 where it causing the display system to display an operation of a prize selector to select a prize amount from among a plurality of available prize amounts and causing the display system to replace a symbol in the third line of symbols with a new prize symbol associated with the prize amount before awarding a prize. An example embodiment of such as sequence is depicted in FIG. 3, which the prize selector is a wheel spun to select a segment. In other embodiments, other elements may be used to display randomly selecting a prize. In preferred embodiments, such elements include a display with multiple prize amounts depicted either simultaneously or in some sequence, and a display sequence depicting randomly selecting among the multiple elements. In some embodiments, another method of depicting random selection of a prize may be used without displaying multiple prizes, and instead displaying only the single prize selected through activating a prize selector. Activating the selector generally includes displaying a graphic sequence that shows the selector in operation with animation depicting a randomized process, and producing a result which provides the selected prize.

At block 510, the process checks for an alignment of a prize symbol 64 with a first plurality of multiplier symbols 60 along a single alignment path. Such an alignment forms a winning payline 59 such as that shown in FIG. 1. Responsive to such an alignment, the process goes to block 512 where it awards a prize amount of a prize associated with the prize symbol times a combined multiplier value indicated by the multiplier symbols. If no such alignment is found, and the process skips block 512 and goes to block 514.

At block 514, the process checks for an alignment of a multiple-location prize symbol 64 along multiple alignment paths with a plurality of multiplier symbols on each alignment path. Such an alignment is depicted on game screen 20 of FIG. 2, where the multiple location prize symbol 62 labelled "125" is aligned with two multiplier symbols on each alignment path designated by paylines 59, one with a "2×" and a "3×" multiplier, and one with a "2×" and a "1×" multiplier. If no such alignment is present, the process goes from block 514 to block 518. Responsive to the alignment conditions being present at block 514, the process goes to block 516 where it awards a prize amount of a prize associated with the prize symbol times a combined multiplier value indicated by all the multiplier symbols so aligned.

Block 516 may also include displaying a graphic sequence of combining the multiplier symbols 60 that are as aligned as described to indicate to the player that a larger multiplier is being formed by the multiple alignments. The sequence of game screens 20 and 22 in FIG. 2 depicts such a feature, with a larger multiplier symbol 65 being formed by the display system in place of the four multiplier symbols 60 aligned on paylines 59.

At block 518, the process determines if a bonus trigger is present in the game outcome. In this embodiment, a bonus trigger is two bonus symbols 63 present in the base game outcome. If not, the process ends at block 519. If so, the process goes to block 520 where it conducts a free spin bonus game, as further described with respect to FIG. 6.

Figure 6:
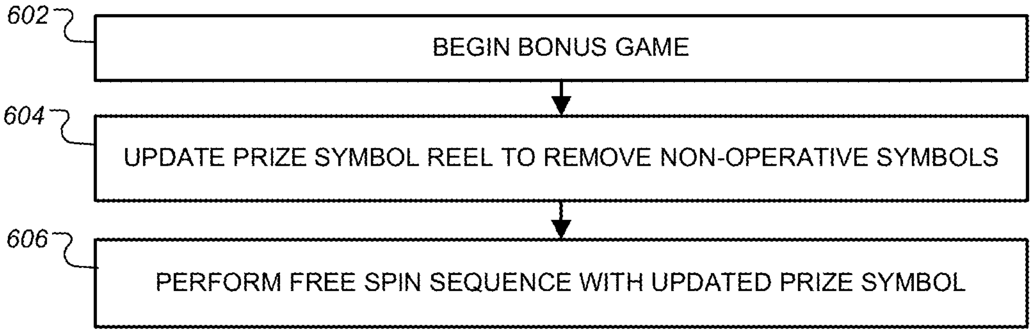
FIG. 6 shows a flow diagram of a process for operating a gaming machine to conduct a bonus game according to some embodiments.

FIG. 6 shows a flow diagram of a process for operating a gaming machine to conduct a bonus game according to some embodiments. Such a bonus game is conducted responsive to a trigger at block 518, for example. The process begins at block 602 responsive to a trigger event such as two bonus symbols 63 appearing in a game outcome.

At block 602, the reel, column, or other line (typically a vertical line) of symbol locations containing prize symbols 62 is updated such that it does not include any non-operative (blank) symbols 61 available to appear in each outcome. Such an altered reel of symbol locations is depicted in FIG. 4, with the right-hand column 52 altered to include no non-operative symbols, and only include a set of symbols with prize symbols 62 and prize selector symbols 64.

At block 604, the process performs a free spin sequence including multiple free spins, which may require individual activations by a player in some versions, or may be conducted sequentially without player activations in other versions. Each free spin uses the modified column 52, and is evaluated using an alignment of multiplier symbols 60 and prize symbols 62 as described above with respect to FIGS. 1-5. The chances of winning large prizes are greatly enhanced due to all symbol locations in the right-hand column 52 containing either prize symbols 62 or prize selector “WHEEL” symbols 64. If a prize selector symbol 64 is present in a free spin outcome, it triggers a wheel spin and subsequent evaluation as described above.

Figure 7:
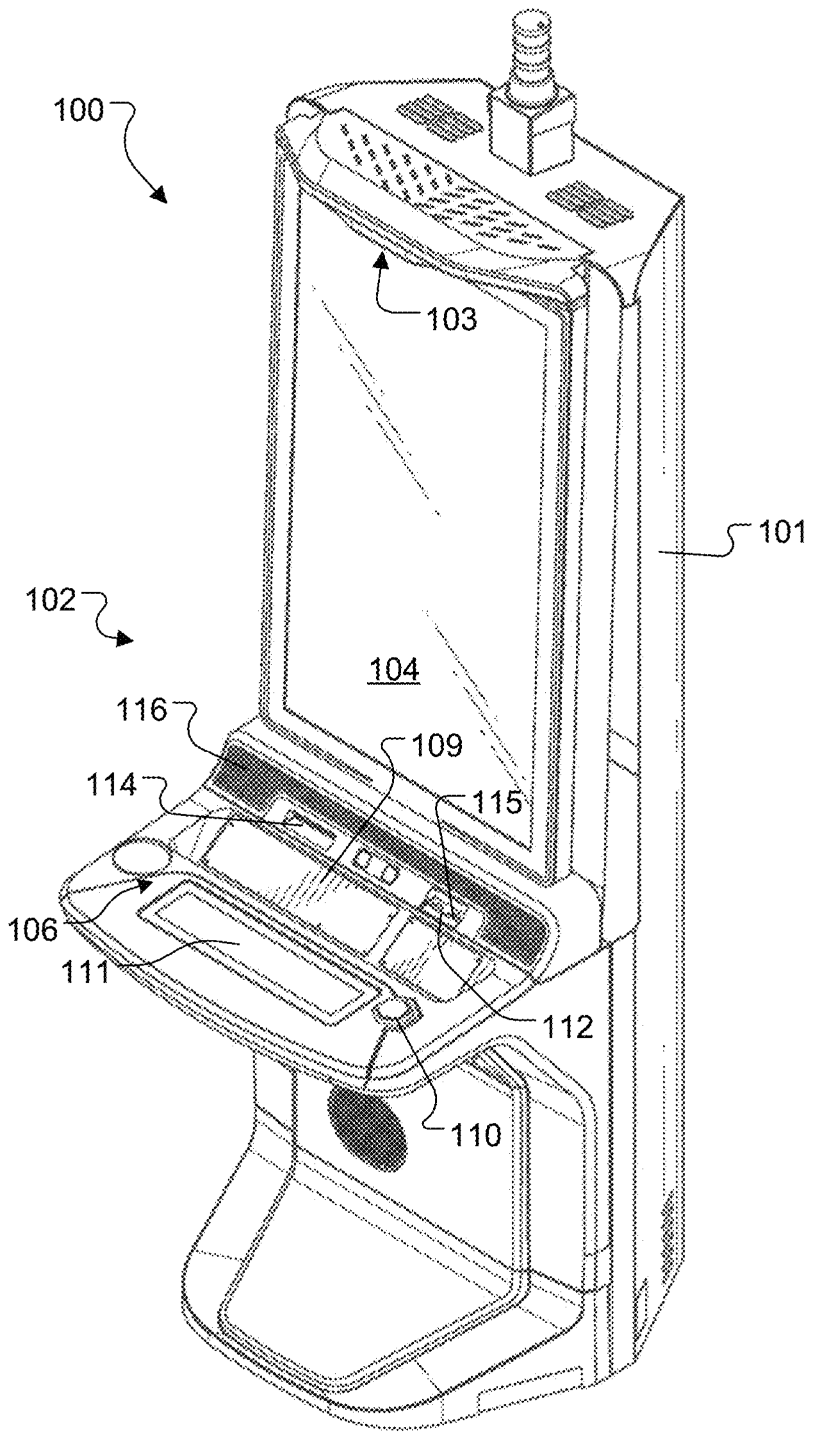
FIG. 7 shows a gaming machine that may be used to implement feature games according to some embodiments.
Figure 8:
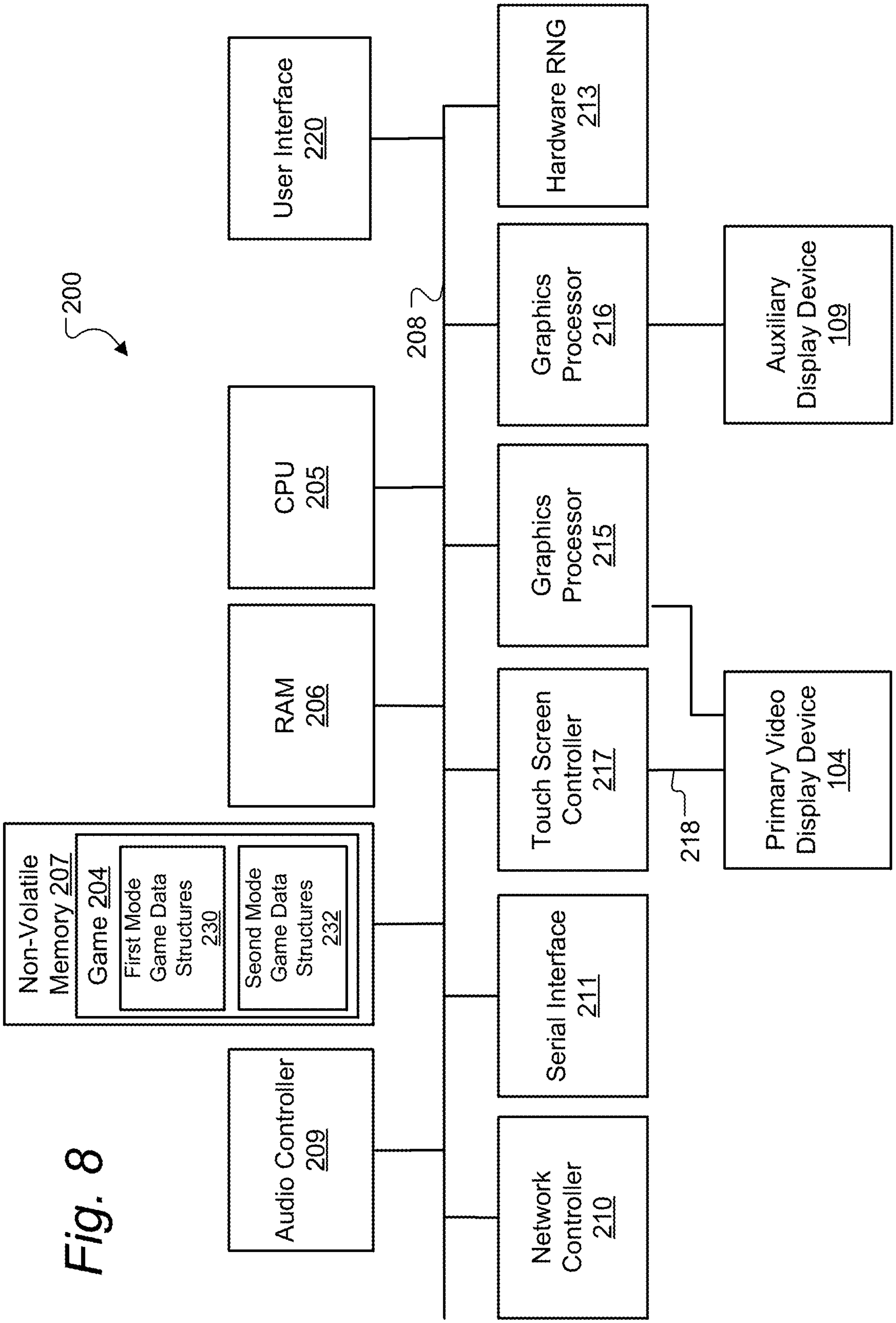
FIG. 8 is a block diagram showing various electronic components of the gaming machine shown in FIG. 7 together with additional gaming system components.

FIG. 7 shows a gaming machine 100 that may be used to implement feature games according to the present invention. The block diagram of FIG. 8 shows further details of gaming machine 100. Referring to FIG. 7, gaming machine 100 includes a cabinet 101 having a front side generally shown at reference numeral 102. Gaming machine 100 includes a display system including one or more display devices such as video displays or mechanical display devices such as spinnable reels or wheels. In the depicted version, the display system includes a primary video display device 104 which is mounted in a central portion of the front side 102, with a ledge 106 positioned below the primary video display device and projecting forwardly from the plane of the primary video display device. Gaming machine 100 also includes two additional smaller auxiliary display devices, and a lower auxiliary display device 109. All of the displays may include touchscreen sensors, especially auxiliary display device 109 which may be used to present touchscreen controls for wagering. It should also be noted that each display device referenced herein may include any suitable display device including a cathode ray tube, liquid crystal display, plasma display, LED display, or any other type of display device currently known or that may be developed in the future.

In preferred versions, the gaming machine 100 illustrated in FIG. 7 also includes a number of mechanical control buttons 110 mounted on ledge 106. These control buttons 110 may allow a player to select a bet level, select paylines, select a type of game or game feature, and activate a play in the primary game. Further, primary video display device 104 in gaming machine 100 provides a convenient display device for implementing touchscreen controls.

Gaming machine 100 may also include a number of other player interface devices in addition to devices that are considered player controls for use in playing a particular game. Ledge 106 may also include a hardware special object including a button, touch sensor, or switches, joysticks, or other mechanical input devices, and/or virtual buttons and other controls implemented on a suitable touchscreen video display. Gaming machine 100 also includes a currency/voucher acceptor 112 having an input ramp, a player card reader having a player card input 114, and a voucher/receipt printer having a voucher/receipt output 115. One or more of these devices provides a credit input device in communication with the controller and adapted for accepting a physical item associated with a monetary value that establishes a player credit balance. Audio speakers 116 generate an audio output to enhance the user’s playing experience. Numerous other types of devices may be included in gaming machines that may be used according to the present invention.

FIG. 8 shows a hardware and logical block diagram 200 of gaming machine 100 which includes a central processing unit (CPU) 205 along with random access memory 206 and nonvolatile memory or storage device 207. All of these devices are connected on a system bus 208 with an audio controller 209, a network controller 210, and a serial interface 211. A graphics processor 215 is also connected on system bus 208 and is connected to drive primary video display device 104 (mounted in cabinet 101 as shown in FIG. 7). A second graphics processor 216 is also connected on system bus 208 in this example to drive the auxiliary display device 109 also shown in FIG. 7. Gaming machine 100 also includes a touch screen controller 217 connected to system bus 208. Touch screen controller 217 is also connected via signal path 218 to receive signals from a touchscreen element associated with primary video display device 104. It will be appreciated that the touchscreen element itself typically comprises a thin film that is secured over the display surface of primary video display device 104. The touchscreen element itself is not illustrated or referenced separately in the figures.

Those familiar with data processing devices and systems will appreciate that other common electronic components will be included in gaming machine 100 such as a power supply, cooling systems for the various system components, audio amplifiers, and other devices that are common in gaming machines. These additional devices are omitted from the drawings so as not to obscure the present invention in unnecessary detail.

All of the elements 205, 206, 207, 208, 209, 210, and 211 shown in FIG. 8 are known elements used in the gaming machine industry. These elements are preferably mounted in a computer chassis which is housed in cabinet 101 shown in FIG. 7. Alternatively, the various electronic components may be mounted on one or more circuit boards or modules housed within cabinet 101 without a separate enclosure. Those familiar with data processing systems and the various data processing elements shown in FIG. 8 will appreciate that many variations on this illustrated structure may be used within the scope of the present invention. For example, since serial communications are commonly employed to communicate with a touch screen controller such as touch screen controller 217, the touch screen controller may not be connected on system bus 208, but instead include a serial communications line to serial interface 211, which may be a USB controller or a IEEE 1394 controller for example. It will also be appreciated that some of the devices shown in FIG. 8 as being connected directly on system bus 208 may in fact communicate with the other system components through a suitable expansion bus. Audio controller 209, for example, may be connected to the system via a PCI bus. System bus 208 is shown in FIG. 8 merely to indicate that the various components are connected in some fashion for communication with game processor/CPU 205 and is not intended to limit the invention to any particular bus architecture. Numerous other variations in the gaming machine internal structure and system may be used without departing from the principles of the present invention.

Although separate graphics processor 215 is shown for controlling primary video display device 104, and graphics processor 216 is shown for controlling both auxiliary display device 109, it will be appreciated that game processor/CPU 205 may control all of the display devices directly without any intermediate graphics processor. The invention is not limited to any particular arrangement of processing devices for controlling the video display device included with gaming machine 100. Also, a gaming machine implementing the present invention is not limited to any particular number of video display devices or other types of display devices.

In the illustrated gaming machine 100, game processor/CPU 205 executes software which ultimately controls the entire gaming machine including the receipt of player inputs and the presentation of the graphic symbols displayed according to the invention through the display devices 104 and 109 associated with the gaming machine. As will be discussed further below, game processor/CPU 205 either alone or in combination with graphics processor 215 may implement a presentation controller for performing functions associated with a primary game that may be available through the gaming machine, and may also implement a game client for directing one or more display devices at the gaming machine to display the feature game mode according to the present invention. Game processor/CPU 205 also executes software related to communications handled through network controller 210, and software related to various peripheral devices such as those connected to the system through audio controller 209, serial interface 211, and touch screen controller 217. Game processor/CPU 205 may also execute software to perform accounting functions associated with game play. Random access memory 206 provides memory for use by game processor/CPU 205 in executing its various software programs, while the nonvolatile memory or storage device 207 may comprise a hard drive or other mass storage device providing storage for programs not in use or for other data generated or used in the course of gaming machine operation. Network controller 210 provides an interface to other components of a gaming system in which gaming machine 100 is included.

It should be noted that the invention is not limited to gaming machines employing the arrangement of processing devices and interfaces shown in example gaming machine 100. Other gaming machines through which the features herein are implemented may include one or more special purpose processing devices to perform the various processing steps for implementing the present invention, such as generating random numbers or checking the security status of software packages or gaming credit vouchers. Unlike processing devices such as game processor/CPU 205, these special purpose processing devices may not employ operational program code to direct the various processing steps.

Still referring to the hardware and logical block diagram 200 showing an example design for a gaming machine 100, the depicted machine in operation is controlled generally by game processor/CPU 205 which stores operating programs and data in non-volatile memory or storage device 207 with game module 204, and software or drivers for user interface 220, network controller 210, audio/visual controllers, and a hardware random number generator (RNG) 213, which is employed if software RNG procedures are not allowed in a particular gaming jurisdiction. Either hardware RNG 213 or a suitable software RNG are employed for making the random selections of game outcomes, reel stop positions, etc. when operating the game as described herein. The game module 204, once installed, also is held in non-volatile memory of the EGM, preferably a separate flash drive or hard drive from the memory holding the EGM operating system. CPU or game processor/CPU 205 may comprise a conventional microprocessor, such as an Intel microprocessor, mounted on a printed circuit board with supporting ports, drivers, memory, software, and firmware to communicate with and control gaming machine operations, such as through the execution of coding stored in non-volatile memory or storage device 207 including one or primary game modules 202, including executable code and data structures such data structures for performing the primary game in the mode 230, and data structures for performing the primary game in the second gaming mode 232. Game processor/CPU 205 connects to user interface 220 such that a player may enter input information, and game processor/CPU 205 may respond according to its programming, such as to apply a wager and initiate execution of a game.

Figure 9:
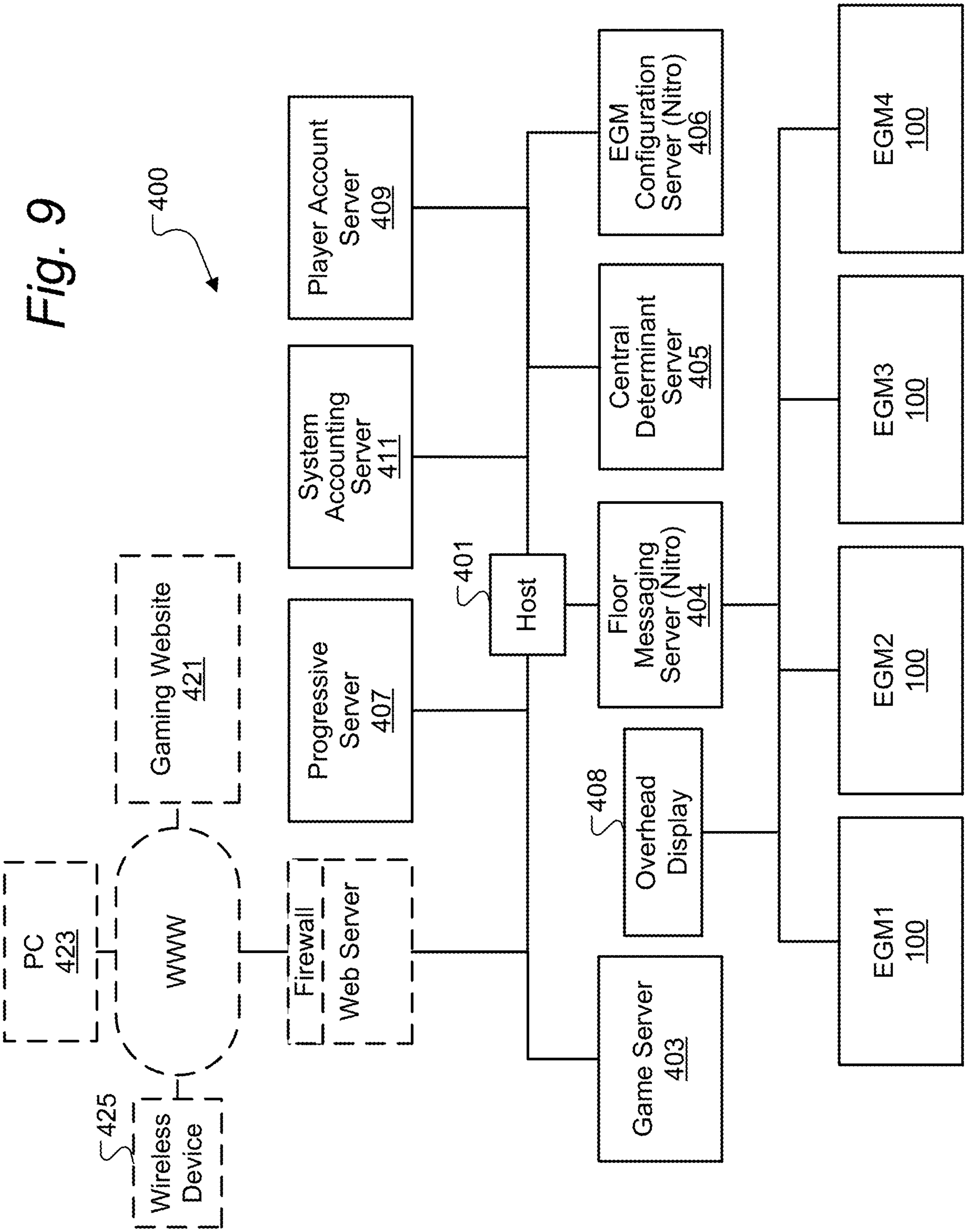
FIG. 9 is a system block diagram of a gaming system according to one embodiment.

Game processor/CPU 205 also may connect through network controller 210 to a gaming network, such as example casino server network 400 shown in FIG. 9.

Referring now to FIG. 9, the casino server network 400 may be implemented over one or more site locations and include host server 401, and an EGM configuration server 406 (in the preferred version the Even Games Nitro Host server) for managing the configuration of multiple EGMs 100 on the network. A group display device or overhead display 408 is coupled to casino server network 400 may include its own controller and graphics processor for driving the group display in response to commands received over a network connection. The network may also include remote game play server 403 (which may be configured to provide game processor functionality including determining game outcomes and providing audio/visual instructions to a remote gaming device), a floor messaging server 404, central determinant server 405 (which may be configured to determine lottery, bingo, or other centrally determined game outcomes and provide the information to networked gaming machines 100 providing lottery and bingo-based wagering games to patrons), progressive server 407 (which may be configured to accumulate a progressive pool from a portion of wagering proceeds or operator marketing funds and to award progressive awards upon the occurrence of a progressive award winning event to one or more networked gaming machines 100), player account server 409 (which may be configured to collect and store player information and/or awards and to provide player information to gaming machines 100 after receiving player identification information such as from a player card), and accounting server 411 (which may be configured to receive and store data from networked gaming machines 100 and to use the data to provide reports and analyses to an operator). Through its network connection, gaming machine 100 may be monitored by an operator through one or more servers such as to assure proper operation, and, data and information may be shared between gaming machine 100 and respective of the servers in the network such as to accumulate or provide player promotional value, to provide server-based games, or to pay server-based awards. While some of the servers have been shown separately, they may be combined or split into additional servers having additional capabilities.

As shown, networked gaming machines 100 (EGM1-EGM4) and one or more overhead group displays 408 may be network connected and enable the content of one or more displays of gaming machines 100 to be mirrored or replayed on an overhead display. EGMs 100 may also feed celebration graphics directly to the overhead displays 408 in the course of providing games, for example to show a celebration for a large bonus win or group gaming mode win on a particular EGM 100. Typically the overhead display function and group celebration scenarios are managed by a floor messaging server such as Nitro floor messaging server 404, which receives messages from EGM's 100 to communicate group gaming mode wins, bonus game wins, or awards of other large prizes such as progressive prizes. The primary display content may also be stored by the display controller or game processor/CPU 205 and transmitted through network controller 210 to the overhead display controller either substantially simultaneously or at a subsequent time according to either periodic programming executed by game processor/CPU 205 or a triggering event, such as a jackpot or large win, at a respective gaming machine 100. In the event that gaming machines 100 have cameras installed, the respective player's video images may be displayed on overhead display 408 along with the content of the player's gaming machine 100 and any associated audio feed.

In one or more embodiments, game server 403 may provide server-based games and/or game services to network connected gaming devices, such as gaming machines 100 (which may be connected by network cable or wirelessly). Progressive server 407 may accumulate progressive awards by receiving defined amounts (such as a percentage of the wagers from eligible gaming devices or by receiving funding from marketing or casino funds) and provide progressive awards to winning gaming devices upon a progressive event, such as a progressive jackpot game outcome or other triggering event such as a random or pseudo-random win determination at a networked gaming device or server (such as to provide a large potential award to players playing the community feature game). Accounting server 411 may receive gaming data from each of the networked gaming devices, perform audit functions, and provide data for analysis programs, such as the IGT Mariposa program bundle.

Player account server 409 may maintain player account records, and store persistent player data such as accumulated player points and/or player preferences (e. g. game personalizing selections or options). For example, the player tracking display may be programmed to display a player menu that may include a choice of personalized gaming selections that may be applied to a gaming machine 100 being played by the player.

In one or more embodiments, the player menu may be programmed to display after a player inserts a player card into the card reader. When the card reader is inserted, an identification may be read from the card and transmitted to player account server 409. Player account server 409 transmits player information through network controller 210 to user interface 220 for display on the player tracking display. The player tracking display may provide a personalized welcome to the player, the player's current player points, and any additional personalized data. If the player has not previously made a selection, then this information may or may not be displayed. Once the player makes a personalizing selection, the information may be transmitted to game processor/CPU 205 for storing and use during the player's game play. Also, the player's selection may be transmitted to player account server 409 where it may be stored in association with the player's account for transmission to the player in future gaming sessions. The player may change selections at any time using the player tracking display (which may be touch sensitive or have player-selectable buttons associated with the various display selections).

In one or more embodiments, a gaming website may be accessible by players, e.g. gaming website 421, whereon one or more games may be displayed as described herein and played by a player such as through the use of personal computer 423 or handheld wireless device 425 (e.g. Apple iPhone, Android phone, tablet, phablet, virtual reality device, iPad, etc.). To enter the website, a player may log in with a username (that may be associated with the player's account information stored on player account server 409 or be accessible by a casino operator to obtain player data and provide promotional offers), play various games on the website, make various personalizing selections and save the information, so that during a next gaming session at a casino establishment, the player's playing data and personalized information may be associated with the player's account and accessible at the player's selected gaming machine 100.

Referring generally to the description herein, any use of ordinal terms such as "first," "second," "third," etc., to refer to an element does not by itself connote any priority, precedence, or order of one element over another, or the temporal order in which acts of a method are performed. Rather, unless specifically stated otherwise, such ordinal terms are used merely as labels to distinguish one element having a certain name from another element having a same name (but for use of the ordinal term).

Further, as described herein, the various features have been provided in the context of various described embodiments, but may be used in other embodiments. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

The above described preferred embodiments are intended to illustrate the principles of the invention, but not to limit the scope of the invention. Various other embodiments and modifications to these preferred embodiments may be made by those skilled in the art without departing from the scope of the present invention.

The invention claimed is:

1. A method for controlling operation of a gaming machine, the method including:

(a) in response to a play input entered through a player input device of the gaming machine and under control of a processing system of the gaming machine, causing a display system of the gaming machine to display a base result representation in a first area of the display system comprising a matrix of symbol locations including a first line of symbols randomly selected from among multiplier symbols and non-operative symbols, a second line of symbols randomly selected from among multiplier symbols and non-operative symbols, and a third line of symbols randomly selected from among prize symbols and non-operative symbols, the prize symbols comprising multiple-location symbols spanning multiple adjacent symbol locations and single location symbols;

(b) in response to an alignment of a prize symbol with a first plurality of multiplier symbols along a single alignment path defined through the matrix, awarding a prize amount of a prize associated with the prize symbol times a combined multiplier value indicated by the multiplier symbols;

(c) in response to an alignment of a multiple-location prize symbol along multiple alignment paths defined through the matrix, each alignment path including a plurality of multiplier symbols, awarding a prize amount of a prize associated with the multiple-location prize symbol times a combined multiplier value calculated as a product of all the multiplier symbols aligned across the multiple alignment paths; and (d) causing the display system to display a graphic sequence visually combining the plurality of multiplier symbols from the multiple alignment paths into a single larger multiplier symbol representing the combined multiplier value, thereby providing visual feedback to a player of the combined multiplier effect.

2. The method of claim 1, wherein the first, second, and third lines of symbols are slot machine reels.

3. The method of claim 1, further comprising in response to a trigger condition for the play input and under control of the processing system, causing the display system to display an operation of a prize selector to select a prize amount from among a plurality of available prize amounts and causing the display system to replace a symbol in the third line of symbols with a new prize symbol associated with the prize amount before awarding a prize.

4. The method of claim 3, wherein the trigger condition is a designated symbol appearing in the third line of symbols.

5. The method of claim 3, wherein the prize selector is a selector wheel positioned in a second display area of the display system.

6. The method of claim 1, further comprising, in response to a bonus trigger event, entering a bonus mode in which at least one of the first, second, and third lines of symbols includes no non-operative symbols.

7. The method of claim 6, further comprising, in which the third line of symbols includes no non-operative symbols.

8. A gaming machine comprising:

a display system, an audio device, a player input device, and at least one electronic controller operatively coupled to the display system, the audio device, and the player input device and configured to execute instructions related to a game; and tangible, non-transitory electronically accessible memory coupled to the at least one electronic controller and containing program code executable by the at least one electronic controller for:

(a) in response to a play input entered through a player input device of the gaming machine and under control of a processing system of the gaming machine, causing a display system of the gaming machine to display a base result representation in a first area of the display system comprising a matrix of symbol locations including a first line of symbols randomly selected from among multiplier symbols and non-operative symbols, a second line of symbols randomly selected from among multiplier symbols and non-operative symbols, and a third line of symbols randomly selected from among prize symbols and non-operative symbols, the prize symbols comprising multiple-location symbols spanning multiple adjacent symbol locations and single location symbols;

(b) in response to an alignment of a prize symbol with a first plurality of multiplier symbols along a single alignment path defined through the matrix, awarding a prize amount of a prize associated with the prize symbol times a combined multiplier value indicated by the multiplier symbols;

(c) in response to an alignment of a multiple-location prize symbol along multiple alignment paths defined through the matrix, each alignment path including a plurality of multiplier symbols, awarding a prize amount of a prize associated with the multiple-location prize symbol times a combined multiplier value calculated as a product of all the multiplier symbols aligned across the multiple alignment paths; and (d) causing the display system to display a graphic sequence visually combining the plurality of multiplier symbols from the multiple alignment paths into a single larger multiplier symbol representing the combined multiplier value, thereby providing visual feedback to a player of the combined multiplier effect.

9. The gaming machine of claim 8, wherein the first, second, and third lines of symbols are slot machine reels.

10. The gaming machine of claim 8, further comprising in response to a trigger condition for the play input and under control of the processing system, causing the display system to display an operation of a prize selector to select a prize amount from among a plurality of available prize amounts and causing the display system to replace a symbol in the third line of symbols with a new prize symbol associated with the prize amount before awarding a prize.

11. The gaming machine of claim 10, wherein the trigger condition is a designated symbol appearing in the third line of symbols.

12. The gaming machine of claim 11, wherein the prize selector is a selector wheel positioned in a second display area of the display system.

13. The gaming machine of claim 8, further comprising, in response to a bonus trigger event, entering a bonus mode in which at least one of the first, second, and third lines of symbols includes no non-operative symbols.

14. The gaming machine of claim 13, in which the third line of symbols includes no non-operative symbols.

15. A tangible, non-transitory computer readable medium holding a program product for execution by a controller of a gaming machine, the program product including machine instruction program code for:

(a) in response to a play input entered through a player input device of the gaming machine and under control of a processing system of the gaming machine, causing a display system of the gaming machine to display a base result representation in a first area of the display system comprising a matrix of symbol locations including a first line of symbols randomly selected from among multiplier symbols and non-operative symbols, a second line of symbols randomly selected from among multiplier symbols and non-operative symbols, and a third line of symbols randomly selected from among prize symbols and non-operative symbols, the prize symbols comprising multiple-location symbols spanning multiple adjacent symbol locations and single location symbols;

(b) in response to an alignment of a prize symbol with a first plurality of multiplier symbols along a single alignment path defined through the matrix, awarding a prize amount of a prize associated with the prize symbol times a combined multiplier value indicated by the multiplier symbols;

(c) in response to an alignment of a multiple-location prize symbol along multiple alignment paths defined through the matrix, each alignment path including a plurality of multiplier symbols, awarding a prize amount of a prize associated with the multiple-location prize symbol times a combined multiplier value calculated as a product of all the multiplier symbols aligned across the multiple alignment paths; and (d) causing the display system to display a graphic sequence visually combining the plurality of multiplier symbols from the multiple alignment paths into a single larger multiplier symbol representing the combined multiplier value, thereby providing visual feedback to a player of the combined multiplier effect.

16. The medium holding a program product of claim 15, wherein the first, second, and third lines of symbols are slot machine reels.

17. The medium holding a program product of claim 15, wherein the program code is further executable for, in response to a trigger condition for the play input and under control of the processing system, causing the display system to display an operation of a prize selector to select a prize amount from among a plurality of available prize amounts and causing the display system to replace a symbol in the third line of symbols with a new prize symbol associated with the prize amount before awarding a prize.

18. The medium holding a program product of claim 17, wherein the trigger condition is a designated symbol appearing in the third line of symbols.

19. The medium holding a program product of claim 18, wherein the prize selector is a selector wheel positioned in a second display area of the display system.

* * * * *